Nov. 14, 1961  A. R. BIEDESS  3,008,566
ARTICULATED CONVEYOR
Filed March 31, 1959  4 Sheets-Sheet 1

INVENTOR.
ANTHONY R. BIEDESS

BY  Murray A. Gleeson
ATTORNEY

Nov. 14, 1961 A. R. BIEDESS 3,008,566
ARTICULATED CONVEYOR
Filed March 31, 1959 4 Sheets-Sheet 2
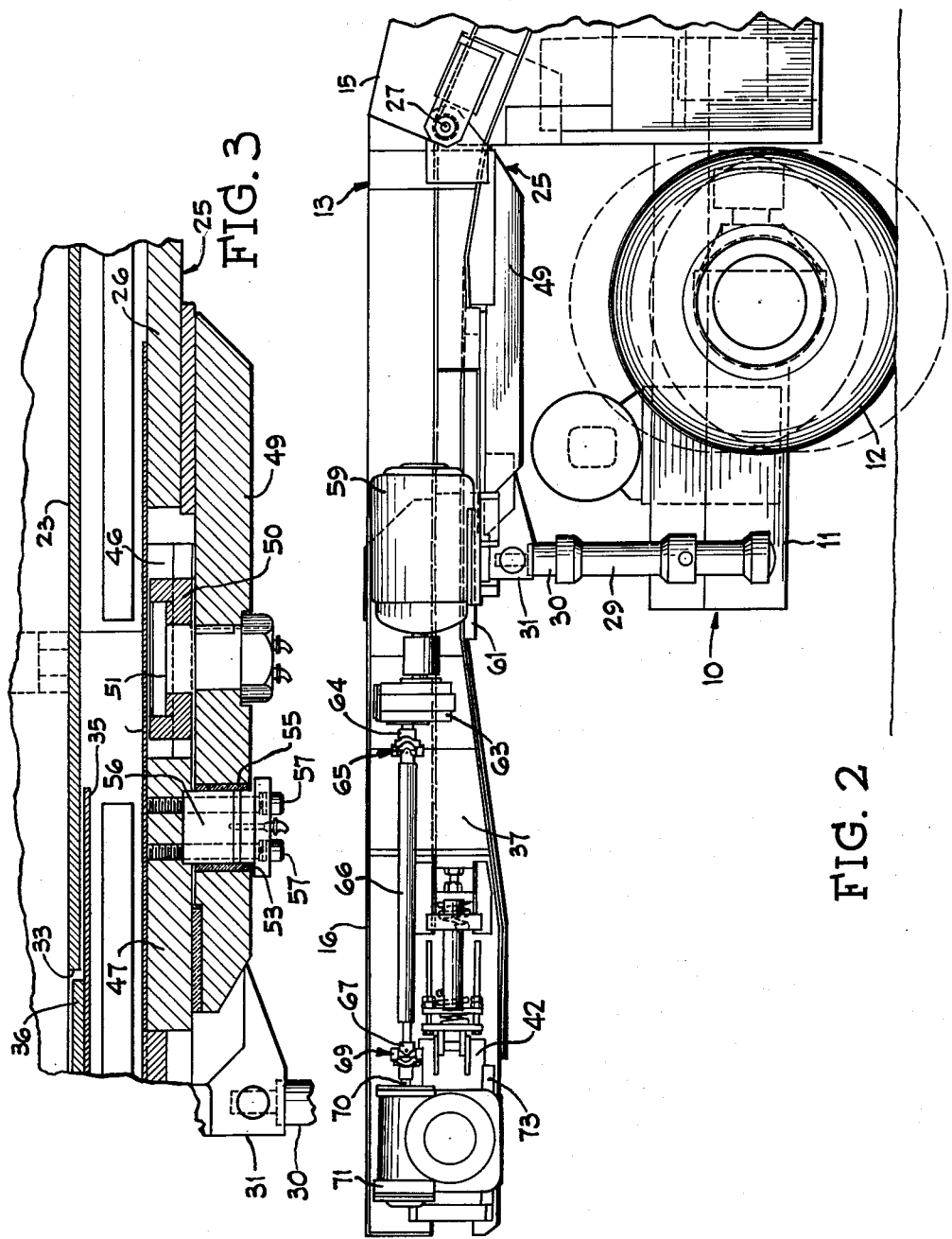
INVENTOR.
ANTHONY R. BIEDESS
BY Murray A. Gleeson
ATTORNEY Nov. 14, 1961  A. R. BIEDESS  3,008,566
ARTICULATED CONVEYOR
Filed March 31, 1959  4 Sheets-Sheet 3

INVENTOR.
ANTHONY R. BIEDESS

Murray A. Gleeson
BY  ATTORNEY

Nov. 14, 1961 A. R. BIEDESS 3,008,566
ARTICULATED CONVEYOR
Filed March 31, 1959 4 Sheets-Sheet 4

INVENTOR.
ANTHONY R. BIEDESS

Murray A. Gleeson
ATTORNEY

BY

United States Patent Office 3,008,566
Patented Nov. 14, 1961

3,008,566
ARTICULATED CONVEYOR
Anthony R. Biedess, Chicago, Ill., assignor to Goodman Manufacturing Company, Chicago, Ill., a corporation of Illinois
Filed Mar. 31, 1959, Ser. No. 803,134
4 Claims. (Cl. 198—208)

This invention relates to improvements in articulated conveyors and more particularly relates to improvements in the swinging and tensioning means for loading machine types of articulated conveyors particularly adapted for use in mines underground.

A principal object of the invention is to provide a simplified form of articulated conveyor having a more efficient and compact mechanism for laterally swinging the conveyor.

Another object of the invention is to provide a means for laterally swinging the conveyor of an articulated conveyor for a loading machine and the like in which a relatively short stroke cylinder and piston may be used to swing the conveyor laterally to the full extent of lateral movement thereof in both directions from the longitudinal center line of the conveyor.

A further object of the invention is to provide an articulated conveyor of the laterally flexible center strand chain and flight type, having a laterally swingable trough section moved longitudinally during laterally swingable movement thereof to maintain a uniform tension on the chain for the conveyor, in which the means for swinging the conveyor laterally exerts a swinging force on the conveyor tending to extend the conveyor during movement away from the longitudinal center line thereof and tends to retract the conveyor during movement toward the longitudinal center line thereof, and thereby co-operates with the mechanism for extensibly and retractibly moving the conveyor to compensate for changes in length of the conveyor as it is swung from side to side.

A still further object of the invention is to provide a take-up for a chain and flight type of conveyor in which the conveyor chain is loaded under no spring tension and in which the direction changing sprocket for the conveyor is mounted to yieldably move inwardly of the conveyor should rock, coal or the like become entrapped between the chain and drive sprocket for the conveyor.

These and other objects of the invention will appear from time to time as the following specification proceeds and with reference to the accompanying drawings wherein:

FIGURE 2 is a fragmentary view in side elevation of the rear end portion of the loading machine shown in FIGURE 1;

FIGURE 3 is a detail fragmentary longitudinal sectional view taken substantially along line III—III of FIGURE 1 and showing the swingable mounting for the discharge trough section of the conveyor;

Figure 1:
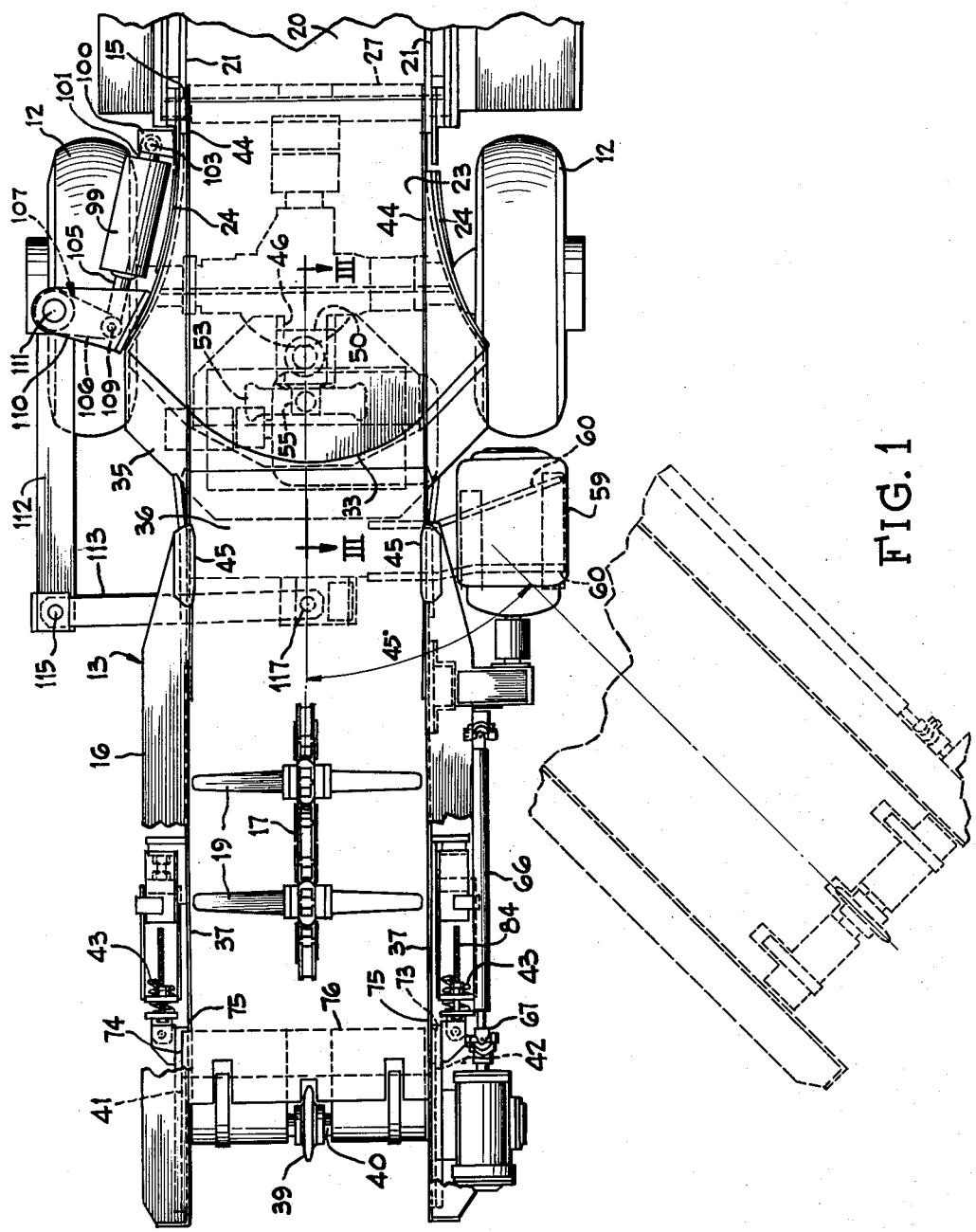
FIGURE 1 is a fragmentary plan view of the rear end portion of a loading machine and illustrating one form in which my invention may be embodied.

In the embodiment of the invention illustrated in the drawings, the rear end portion of a loading machine 10 of a type operable in mines underground is shown for illustrative purposes. The loading machine 10 includes a main frame 11 mounted on rubber tired wheels 12. An articulated conveyor 13 is shown as extending along the main frame 11 and as including a front elevating trough section 15 and a rear discharge trough section 16, extending therefrom and mounted on the main frame 11 for lateral and vertical adjustable movement with respect to the front trough section 15.

The conveyor 13 is shown as being a center strand laterally flexible endless chain and flight type of conveyor including a plurality of aligned strands of chain 17 pivotally connected at their ends to laterally extending flights 19 for movement with respect thereto about vertical axes. The endless chain comprising the strands of chain 17 and pivotally connected flights 19 is guided along the trough sections 15 and 16 on the ends of the flights 19, engaging the side walls of the trough sections of the conveyor, as is usual with such conveyors.

The trough section 15 is only fragmentarily shown herein and has the usual idler sprocket (not shown) mounted at its forward end about which the chain 17 and flights 19 change their direction of travel as they move upwardly along a bottom plate 20 of said trough section between side walls 21 thereof, extending along opposite sides of said bottom plate. The bottom plate 20 terminates into a stationary plate 23 flaring outwardly toward its rear end portion and having flared side walls 24 extending therealong to the rear end portion thereof.

The stationary plate 23 is a part of a box-like frame structure 25 (see FIGURES 1 and 3). The box-like frame structure 25 includes a bottom plate 26 along which the return run of the chain 17 and flights 19 travel when moving toward the front of the conveyor. The box-like frame structure 25 forms a support for the discharge trough section 16 and is mounted at its forward end for vertical movement about the axis of a pivot shaft 27, mounting the discharge trough section 16 for vertical movement about the axis of said pivot shaft by operation of spaced hydraulic jacks 29 mounted on opposite sides of the main frame 11 adjacent the rear end portion thereof, as shown in FIGURE 2. The hydraulic jacks 29 may be transversely pivoted to the main frame 11 in a suitable manner, and have extensible piston rods 30 pivotally connected to connectors 31, secured to and depending from the box-like frame structure 25, to vertically adjust the trough-section 15 about the axis of the pivot shaft 27 in an obvious manner, so not herein shown or described further.

The stationary plate 23 flares outwardly toward its rear end portion and has a generally arcuate rear end portion 33 overlapping a widened stationary plate 35, along which moves a bottom plate 36 of the trough section 16 during lateral adjustable movement of said trough section.

The trough section 16 includes the bottom plate 36 and parallel spaced side walls 37 extending therealong, and has a drive sprocket 39 for the conveyor chain 17, keyed or otherwise secured to a transverse shaft 40. The shaft 40 is journalled adjacent its opposite ends in bearing support plates 41 and 42 slidably mounted in the side walls 37 and retained in position by take ups including compression springs 43, 43, loaded to maintain the chain 17 under zero tension during operation of the conveyor, as will hereinafter more clearly appear as the specification proceeds.

Figure 5:
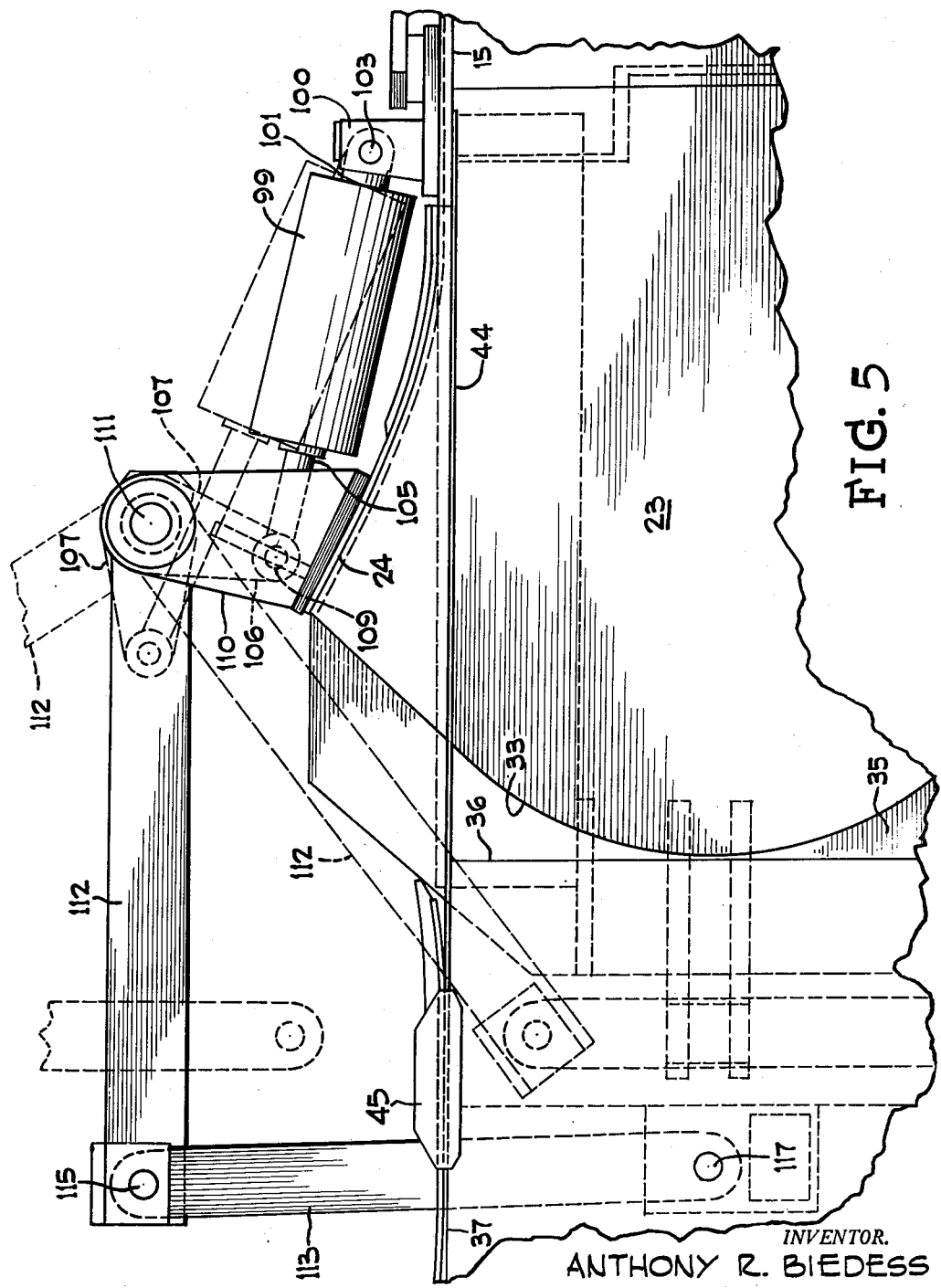
FIGURE 5 is an enlarged fragmentary plan view of the conveyor showing the positions of the linkage mechanisms for swinging the conveyor to its extreme positions of adjustment.

The side walls 21 are connected with the side walls 37 of the trough section 16 by flexible side walls 44, secured at their advance ends to the side walls 21 and extending across the bottom plate 23. The flexible side walls 44 are slidably guided in guides 45 mounted on the side walls 37 of the trough section 16 adjacent the advance ends thereof, and extending inwardly therefrom (FIGURES 1 and 5).

A pivot means is provided to maintain the length of the path of travel of the chain 17 and flights 19 uniform during lateral swinging movement of the discharge end portion of the conveyor, which is herein shown as comprising a generally longitudinally extending guide 46 extending along a plate 47 and opening toward the forward end of said plate. The plate 47 forms a laterally movable support for the trough section 16 and is movably mounted on a bottom plate 49 of the box-like frame structure 25. The guide 46 is slidably engaged by a block 50 pivotally mounted on a pivot pin 51, keyed or otherwise secured to the plate 49.

The plate 49 has a transversely extending slot 53 formed therein and spaced rearwardly of the slot 46 and block 50. The slot 53 is slidably engaged by a bearing block 55 mounted on a pivot pin 56 depending from the bottom of the plate 47 and secured thereto, as by cap screws 57.

The bearing blocks 50 and 55 thus form movable pivots for the laterally swingable discharge end portion 16 of the conveyor, and serve to retract the discharge end portion 16 of the conveyor, when the conveyor is in the longitudinally aligned position shown in FIGURE 1 and to extend said discharge end portion of the conveyor, as the conveyor swings laterally to one side or the other of center, to maintain a path of travel for the conveyor chain 17 and flights 19, which is of a uniform length in all positions of lateral adjustment of the trough section 16.

The drive to the conveyor chain 17 and flights 19 includes a motor 59 mounted on spaced brackets 60 extending laterally from a bottom plate 61 forming a continuation of the plate 47 (FIGURES 1 and 2). The motor 59 has drive connection with a speed reducer 63 mounted on the outer side of the left hand side wall 37 and spaced outwardly therefrom. The speed reducer 63 has a drive member 64 of a universal coupling 65 journalled therein and driven thereby. The universal coupling 65 drives a hollow shaft 66 having slidable driving engagement with a drive member 67 of a universal coupling 69. The driven member of the universal coupling 69 is mounted on the outer end of a shaft 70, journalled in a worm and worm gear housing 71. The worm and worm gear (not shown) within the worm gear housing 71 has driving connection with the shaft 40 for driving said shaft. The worm and worm gear housing 71 is mounted on the bearing support plate 42 and extends outwardly therefrom. The bearing support plate 42 in turn is slidably mounted in spaced gibbed guides 73 extending along one side wall 37 and affords a means to accommodate the shaft 40 and sprocket 39 to move backwardly in cases where rock and the like may become entrained between the chain 17 and flights 19 and the sprocket 39. The bearing support plate 41, like the bearing support plate 42, is slidably guided in gibbed guides 74 extending along the opposite side wall 37.

The springs 43 are provided to bias the bearing support plates 41 and 42 in position to maintain the proper tension on the chain 17, which in the present invention is maintained under zero tension when the conveyor is idle, and to accommodate backward movement of the shaft 40 and sprocket 39 when rock, cutter bits and the like may be entrained between the chain 17 and the sprocket 39. The bearing support plate 42 has spaced lugs 77 extending outwardly therefrom. The bearing support plate 41 has similar lugs projecting outwardly therefrom. The springs 43 and their mountings on the side walls 37, for loading the conveyor chain 17 under zero tension, are the same on each side of the machine, so one side only need herein be described in detail.

Figure 4:
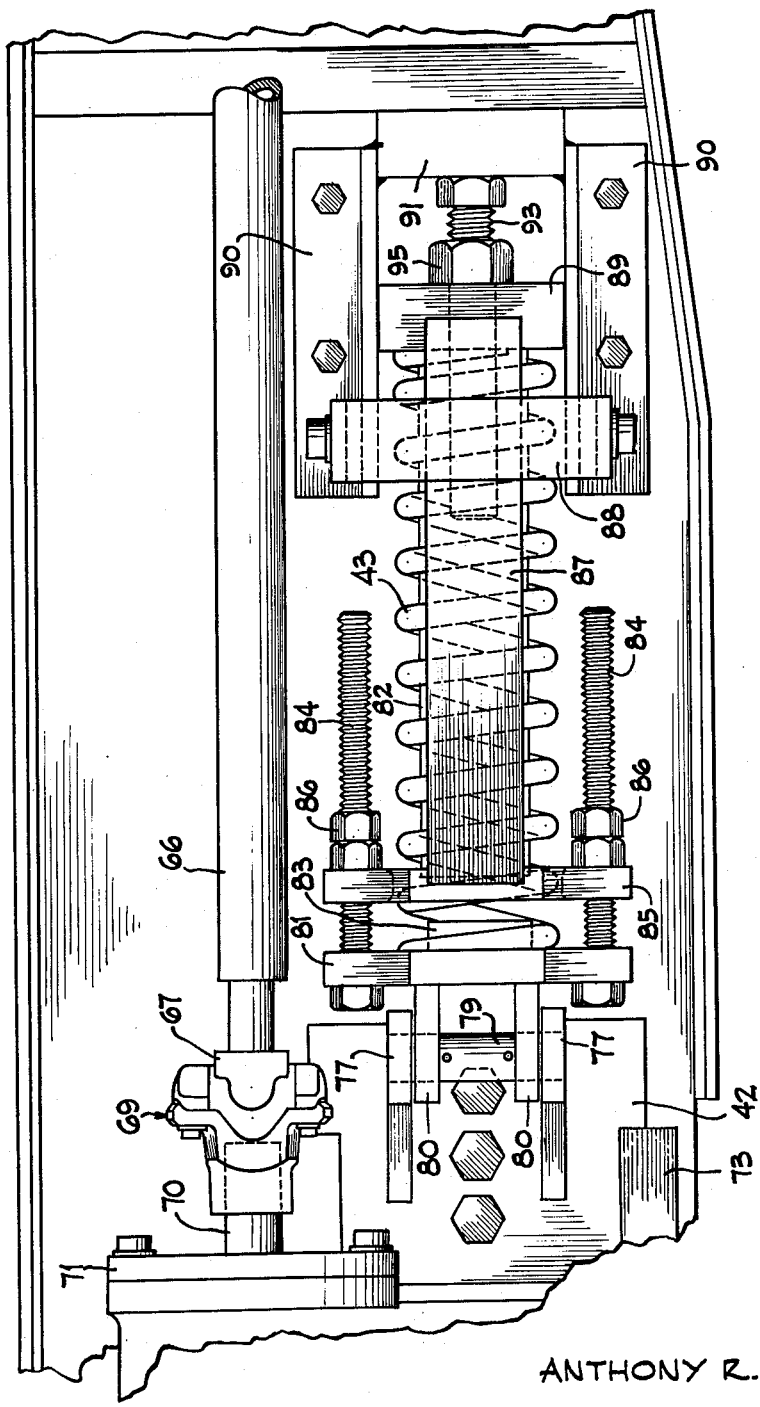
FIGURE 4 is a detail view in side elevation of one of the tensioning means for the conveyor.

The lugs 77 have a pivot pin 79 mounted thereon, forming a pivotal mounting for spaced ears 80 extending from a seating plate 81 for the spring 43 (FIGURE 4). The seating plate 81 has a lug 83 extending therefrom within the coil of the spring 43, and has spaced threaded rods 84 threaded therein and extending therefrom along the spring 43 for a portion of the length thereof. The threaded rods 84 also slidably extend through a stop plate 85 extending about the spring 43. A guide tube 82 is secured to the block 89 and extends within the spring 43. The stop plate 85 is abutted by lock nuts 86 threaded on said threaded rods, on the opposite side of said stop plate from the plate 81. The stop plate 85 is shown as having parallel bars 87 mounted thereon and extending from opposite sides thereof along opposite sides of the spring 43 and slidably guided in a retainer 88 mounted on the horizontal legs of angles 90 extending outwardly from the outer side of the side wall 37. The bars 87 extend along opposite sides of the block 89 and are secured thereto at their forward ends, and fix the spacing of the stop plate 85 with respect to the block 89, and form a guide therefor. The block 89 is guided between the horizontal legs of the vertically spaced angles 90, and forms a seat for the opposite end of the spring 43 from the plate 81. A stop 91 is mounted between the horizontal legs of the angles 90 and forms a stop for the head of an adjustment screw 93, extending through and threaded in the lug 89. The adjustment screw 93 has a lock nut 95 threaded thereon, locking the screw 93 and spring 43 under the selected tension.

The springs 43 are preloaded by the adjustment screws 93, to normally place the conveyor chain 17 under zero tension during operation of the conveyor. When, however, rock, a cutter chain bit or the like may become entrained between the chain 17 and the sprocket 39, the springs 43 will yield, accommodating the sprocket 39 to move against the springs 43 to clear the chain without placing undue tension on the chain. The stop plates 85 form stops for the plates 81 and bearing support plates 41 and 42, limiting extreme inward movement of the sprocket 39 by engagement with the plates 81 and limiting the tension that may be placed on the sprocket 39 by the springs 43, determined by the positions of the lock nuts 86, and thereby limiting the tension on the chain 17 and flights 19 to zero tension.

Referring now in particular to the means for swinging the trough section 16 laterally, and at the same time exerting a swinging action on said trough section tending to lengthen the conveyor as the trough section 16 moves away from center and to shorten the conveyor as the trough section 16 is moved back toward center, a hydraulic actuator, such as a hydraulic jack including a short cylinder 99 having a short stroke piston therein (not shown) is provided to swing the discharge end portion of the conveyor laterally as desired. The cylinder 99 is mounted at its head end between spaced ears 100 extending laterally of the right hand wall 24, adjacent the advance end portion thereof. The ears 100 extend along opposite sides of a connector 101, extending from the head end of the cylinder 99, and pivotally connected to said ears, as by a pivot pin 103. A piston rod 105 is extensible from the cylinder 99 and is pivotally connected to a short arm 106 of a bellcrank 107, as by a pivot pin 109. The bellcrank 107 is mounted between parallel spaced brackets 110 on a pivot pin 111. The brackets 110 are mounted on a flared side wall 24 adjacent the rear end thereof and extend outwardly therefrom. The short arm 106 of the bellcrank 107 extends inwardly of the pivot pin 111 toward the flared side wall 24.

A long arm 112 of the bellcrank 107 extends from the pivot pin 111 in generally parallel relation with respect to the trough section 16, when said trough section is in the centered position shown in FIGURE 1. The arm 112 extends from a point spaced forwardly of the slidable pivotal mounting for the trough section 16 to a position spaced a substantial distance rearwardly of the slidable pivotal mounting for said trough section and has a drive link 113 pivotally mounted on the outer end thereof on a pivot pin 115. The drive link 113 extends inwardly from the long arm 112 toward the center of the trough section 16, and is pivotally connected to the bottom portion of said trough section at the longitudinal center line thereof on the vertical pivot pin 117.

It may be seen with reference to FIGURES 1 and 5 that the relationship between the short arm 106 of the bellcrank 107 and the long arm 112 is such that the discharge trough section 16 will be swung by the long arm 112 through a greater angle than the angle of movement of the arm 106, thereby increasing the compactness of the mechanism for swinging the discharge trough section 16 laterally in either direction and enabling the swinging mechanism to be contained within the limits of the wheels 12 when the discharge trough section 16 is aligned with the trough section 15, as shown in FIGURE 1.

It should here be noted that the relationship between the point of connection of the long arm 112 to the drive link 113 and the point of connection of the drive link 113 to the pivot pin 117 with regard to the movable pivotal axes for the discharge trough section 16 is such that the drive link 113 exerts a pulling force on the discharge trough section 16 in a direction to tend to lengthen the conveyor, as the conveyor is swung outwardly past center in either direction. The drive link 113 also acts in a direction to push the discharge trough section toward the flared plate 23 as the discharge trough section is moved toward center from laterally extended positions to either side of the machine. This materially reduces the forces required to lengthen or shorten the conveyor to conform to the path of travel of the chain 17 and thereby increases the efficiency of the mechanism for laterally positioning the discharge trough section of the conveyor, and with the long arm 112 enables a short stroke cylinder and piston or hydraulic jack, to be used to laterally position the discharge trough section of the conveyor and obviates the necessity of providing cylinders and pistons on each side of the conveyor, as has heretofore been the practice with loading machines and combined mining and loading machines, to laterally position the conveyor of the machine.

It may further be seen that the conveyor chain 17 and flights 19 run slack and that the only tension on the chain and flights is the driving tension thereon. Thus if rock, cutter bits or other hard materials should become entrained between the chain and sprocket, the springs 43 will allow the material to pass between the chain and sprocket without breaking the chain. Such an arrangement obviates the necessity of maintaining a high spring force on the chain and reduces the liability of breaking the chain under excessive spring forces upon the entraining of rock, or other hard materials between the conveyor chain and sprocket.

While I have herein shown and described one form in which my invention may be embodied, it should be understood that various modifications and variations of the invention may be effected without departing from the spirit and scope of the novel concepts thereof.

I claim as my invention:

1. In a conveyor particularly adapted for rock loading machines and the like, a trough section having parallel spaced side walls and a bottom plate extending therebetween, an endless chain and flight conveyor movable along said trough section, a transverse shaft at the rear end of said trough section having at least one sprocket thereon meshing with said endless chain and flight conveyor, a motor and means driven by said motor for driving said sprocket and endless chain and flight conveyor, bearing means mounting said shaft on said side walls and accommodating retractible movement of said shaft along said side walls comprising parallel bearing support plates slidably guided in said side walls, spring take-up means for opposite ends of said transverse shaft comprising spring seating means connected with said bearing support plates and individual loading blocks adjustably guided on said side walls in horizontal alignment with said spring seating means, compression springs seated at their opposite ends on said seating means and loading blocks, means adjustably moving said loading blocks with respect to said seating means for loading said springs, stop means mounted for adjustable movement toward and from said seating means and rigidly connected with said loading blocks for limiting the loading of said springs and the tension of said chain and flight conveyor and limiting retractible movement of said bearing support plates with respect to said loading blocks.

2. In a conveyor particularly adapted for rock loading machines and the like, a trough section having parallel spaced side walls and a bottom plate extending therebetween, an endless chain and flight conveyor movable along said trough section, a transverse shaft at the rear end of said trough section having at least one sprocket thereon meshing with said endless chain and flight conveyor, a motor and a drive connection from said motor to said shaft and conveyor, parallel spaced bearing support plates slidably guided in said side walls and forming bearing supports for said shaft, spring take-up means for opposite ends of said transverse shaft comprising spring seating means connected with said bearing support plates and individual loading blocks adjustably guided on said side walls in horizontal alignment with said spring seating means, compression springs seated at their opposite ends on said seating means and said loading blocks, means adjustably moving said loading blocks with respect to said spring seating means for loading said springs, stop means mounted for adjustable movement toward and from said seating means and spaced along said springs toward said seating means and rigidly connected with said loading blocks for limiting the loading of said springs and the tension on said chain and flight conveyor and retractible movement of said bearing support plates, and means accommodating adjustable movement of said stop means toward and from said seating means and for retaining said stop means in selected spaced relation with respect to said seating means.

3. In a conveyor particularly adapted for rock loading machines and the like, a trough section having parallel spaced side walls and a bottom plate extending therebetween, an endless chain and flight conveyor movable along said trough section, a transverse shaft at the rear end of said trough section having at least one drive sprocket thereon for said endless chain and flight conveyor, a motor mounted on said trough section and means driven by said motor for driving said shaft and chain and flight conveyor, parallel spaced bearing support plates slidably guided in said side walls for movement therealong in the direction of said chain and flight conveyor, spring take-up means for said chain and flight conveyor comprising seating plates mounted on said bearing support plates, loading blocks adjustably guided on said side walls in alignment with said seating plates, compression springs seated on said seating plates and loading blocks at their opposite ends, guide means extending from said seating plates toward said loading blocks, stop plates slidably mounted on said guide means, stop means on said guide means limiting movement of said stop plates toward said loading blocks, and means rigidly connecting said stop plates with said loading blocks whereby the positions of said stop plates along said guide means limits the loading of said compression springs and retractible movement of said shaft and sprocket toward said loading blocks.

4. In a conveyor particularly adapted for rock loading machines and the like, a trough section having parallel spaced side walls and a bottom plate extending therebetween, an endless chain and flight conveyor movable along said trough section, a transverse shaft at the rear end of said trough section having at least one drive and direction changing sprocket for said conveyor thereon, a motor on said trough section and means driven by said motor for driving said shaft and conveyor, parallel bearing support plates slidably guided in said side walls for movement therealong in the direction of said conveyor and forming bearing supports for said shaft, spring take up means for said conveyor comprising seating plates mounted on said bearing support plates, loading blocks adjustably guided on said side walls in aligned spaced relation with respect to said seating plates, means for adjustably moving said loading blocks toward and from said seating plates and for holding said loading blocks in fixed relation with respect thereto, compression springs seated at their opposite ends on said seating plates and loading blocks, guide members extending from said seating plates toward said loading blocks, a stop plate slidably mounted on said guide members, stop means adjustably mounted on said guide members for limiting movement of said stop plates toward said loading plates, and means rigidly connecting said stop plates with said loading blocks in spaced relation with respect thereto and limiting the loading of said springs and retractible movement of said shaft against said springs toward said loading blocks.

References Cited in the file of this patent
UNITED STATES PATENTS

| | | |
|---|---|---|
| 1,774,922 | Hahnenkamm et al. | Sept. 2, 1930 |
| 2,266,770 | Kurtz et al. | Dec. 23, 1941 |
| 2,388,385 | Cartlidge | Nov. 6, 1945 |
| 2,512,610 | Cartlidge | June 27, 1950 |
| 2,612,988 | Andrews | Oct. 7, 1952 |
| 2,815,114 | Tracy | Dec. 3, 1957 |
| 2,828,003 | Witzel | Mar. 25, 1958 |
| 2,856,061 | Seigle et al. | Oct. 14, 1958 |